United States Patent
Zhao et al.

(10) Patent No.: US 10,015,314 B2
(45) Date of Patent: Jul. 3, 2018

(54) CALL COLLISION PROCESSING METHOD FOR TERMINAL DEVICE, AND TERMINAL DEVICE

(71) Applicant: Huawei Technologies Co., Ltd., Shenzhen (CN)

(72) Inventors: Rui Zhao, Shenzhen (CN); Jun Du, Wuhan (CN); Hao Hu, Wuhan (CN); Bo Yu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/547,294

(22) PCT Filed: Jan. 30, 2015

(86) PCT No.: PCT/CN2015/071982
§ 371 (c)(1),
(2) Date: Jul. 28, 2017

(87) PCT Pub. No.: WO2016/119233
PCT Pub. Date: Aug. 4, 2016

(65) Prior Publication Data
US 2018/0013888 A1   Jan. 11, 2018

(51) Int. Cl.
*H04M 3/42*      (2006.01)
*H04M 3/50*      (2006.01)
*H04W 4/16*      (2009.01)
*H04M 3/436*     (2006.01)
*H04M 3/428*     (2006.01)

(52) U.S. Cl.
CPC ......... *H04M 3/50* (2013.01); *H04M 3/42059* (2013.01); *H04M 3/436* (2013.01); *H04W 4/16* (2013.01); *H04M 3/4283* (2013.01)

(58) Field of Classification Search
CPC ........................................................ H04M 3/50
USPC ...................................... 455/414.1, 445, 567
See application file for complete search history.

(56) References Cited

U.S. PATENT DOCUMENTS 5,970,415 A    10/1999  Sarpola et al.
2014/0286308 A1  9/2014  Lee et al.

FOREIGN PATENT DOCUMENTS

CN    1147326 A    4/1997
CN    102893691 A  1/2013
CN    102917326 A  2/2013

*Primary Examiner* — Joel Ajayi
(74) *Attorney, Agent, or Firm* — Slater Matsil, LLP

(57) ABSTRACT

The present disclosure relates to a call collision processing method for a terminal device, and a terminal device. A state machine records that a current state of the terminal device is an incoming call state, an outgoing call state, or an idle state. When the terminal device is in the idle state, that the terminal device processes an incoming call or an outgoing call is determined according to occupation of the state machine by incoming call information or by outgoing call information, and a state of the state machine after the state machine is occupied by the incoming call or the outgoing call is protected by using a mutex lock.

20 Claims, 6 Drawing Sheets

CALL COLLISION PROCESSING METHOD FOR TERMINAL DEVICE, AND TERMINAL DEVICE

CROSS-REFERENCE TO RELATED APPLICATIONS

This application is a National Stage of International Application No. PCT/CN2015/071982, filed on Jan. 30, 2015, which is hereby incorporated by reference in its entirety.

TECHNICAL FIELD

The present invention relates to the field of wireless communications technologies, and particularly, to a call collision processing method for a terminal device, and a terminal device.

BACKGROUND

Currently, a hardware system structure of a smartphone is mainly a dual processor architecture. An application processor runs an operating system, and is responsible for controlling the entire operating system, including additional application functions of the smartphone such as audio/video processing, document processing, and data processing. A baseband processor is responsible for communications protocol processing, and implements a basic communication function of the smartphone. Use of the dual processor architecture can diversify and extend functions of the mobile phone, but also make internal processing of the smartphone more complex.

When a user performs a call by using a mobile phone, there is such a scenario in which the user initiates an outgoing call at a same time when the user receives an incoming call. In a conventional single-card single-pass mobile phone, no collision exists, because for the single-card mobile phone, performing an incoming call or an outgoing call is determined according to a protocol stack preemption sequence in this scenario. If the outgoing call preferentially occupies a protocol stack, incoming call information is processed according to whether incoming call waiting is set in the mobile phone; or if the incoming call preferentially occupies a protocol stack, the outgoing call fails.

However, in a smartphone with the dual processor architecture, outgoing call information needs to first pass through an application processor and then arrives at a baseband processor to complete an outgoing call operation, and incoming call information needs to first pass through the baseband processor and then arrives at the application processor to prompt a user about an incoming call. If an outgoing call of the user is being processed by the application processor and an incoming call has arrived at the baseband processor, a collision occurs and causes a mobile phone processing disorder, and vice versa.

For a dual-card single-pass mobile phone, currently, there is no mechanism for a collision between an incoming call and an outgoing call of different cards (different accounts). Because each account is corresponding to an independent protocol stack, once a case in which an incoming call and an outgoing call simultaneously arrive occurs, the incoming call and the outgoing call separately update their own protocol stacks to which the outgoing call and the incoming call respectively belong. In this case, the outgoing call dwells in a telephone calling interface, but cannot be dialed out, and a calling party who calls the mobile phone hears a ringing indication tone from a called party, but the called party receives no caller ID display. That is, both the incoming call and the outgoing call cannot be performed. Therefore, an effective protection mechanism is lacked for the collision between an incoming call and an outgoing call of the dual-card signal-pass mobile phone.

SUMMARY

In view of this, embodiments of the present invention provide a call collision processing method for a terminal device, and a terminal device, and provide a stable and reliable processing mechanism for a mobile phone, especially a dual-card smartphone. This method can effectively resolve a collision between an incoming call and an outgoing call particularly when the incoming call and the outgoing call simultaneously arrive, so that the incoming call or the outgoing call can be smoothly performed, thereby improving user experience.

According to a first aspect, an embodiment of the present invention provides a call collision processing method for a terminal device, where the terminal device includes a baseband processor, a wireless support apparatus, and an application processor. The method includes receiving, by a baseband processor of a first terminal device, an incoming call request message that is sent by a network and that comes from a second terminal device, where the incoming call request message carries information about a first account of the first terminal device and sending, by the baseband processor, an incoming call prompt message to a wireless support apparatus of the first terminal device according to the incoming call request message, where the incoming call prompt message includes the information about the first account. The method also includes obtaining, by the wireless support apparatus, a state of the first terminal device and when the state of the first terminal device is an idle state, updating, by the wireless support apparatus, the state of the first terminal device to an incoming call state according to the incoming call prompt message, and occupying a mutex lock. Additionally, the method includes sending, by the wireless support apparatus, a state change success message to the baseband processor. Also, the method includes sending, by the baseband processor, the incoming call request message to an application processor of the first terminal device according to the state change success message and prompting, by the application processor, a user about incoming call information according to the incoming call request message.

In a first possible implementation manner, when the wireless support apparatus updates the state of the first terminal device to the incoming call state according to the incoming call prompt message, the method further includes: generating, by the wireless support apparatus, first verification code, where the first verification code includes the information about the first account and information about the second terminal device.

With reference to the first possible implementation manner of the first aspect, in a second possible implementation manner, the method further includes: when the application processor receives a hang-up instruction used to terminate a call connection between the first terminal device and the second terminal device, sending, by the application processor, a call termination message to the wireless support apparatus, where the call termination message includes the information about the first account and the information about the second terminal device; or when the baseband processor receives a hang-up instruction that is sent by the network and that is used to terminate a call connection between the first terminal device and the second terminal device, sending, by the baseband processor, a call termination message to the wireless support apparatus; generating, by the wireless support apparatus, an incoming call state release message according to the call termination message, and unlocking the mutex lock; and resetting, by the first terminal device, the state of the first terminal device to the idle state according to the incoming call state release message and the first verification code.

In a third possible implementation manner, after the wireless support apparatus updates the state of the first terminal device to the incoming call state according to the incoming call prompt message, and occupies the mutex lock, when the application processor receives an outgoing call instruction input by the user, the method further includes: sending, by the application processor, an outgoing call request message to the wireless support apparatus according to the outgoing call instruction; obtaining, by the wireless support apparatus, a state of the first terminal device; and when the state of the first terminal device is the incoming call state, sending, by the wireless support apparatus, outgoing call rejection response information to the application processor.

With reference to the third possible implementation manner of the first aspect, in a fourth possible implementation manner, when the baseband processor sends the incoming call prompt message to the wireless support apparatus of the first terminal device according to the incoming call request message, the application processor sends the outgoing call request message to the wireless support apparatus, and the method further includes: obtaining, by the wireless support apparatus, pre-stored configuration information of an incoming call/outgoing call priority; and choosing, by the wireless support apparatus according to the configuration information, to update the state of the first terminal device to the incoming call state or to an outgoing call state.

In a fifth possible implementation manner, when the state of the first terminal device is an incoming call state or an outgoing call state, the method further includes: sending, by the wireless support apparatus, a state change rejection message to the baseband processor; and sending, to the network by the baseband processor according to the state change rejection message, response information that rejects an incoming call from the second terminal device.

According to a second aspect, an embodiment of the present invention provides a call collision processing method for a terminal device, where the terminal device includes a baseband processor, a wireless support apparatus, and an application processor. The method includes receiving, by an application processor of a first terminal device, an outgoing call instruction input by a user and sending, by the application processor, an outgoing call request message to a wireless support apparatus of the first terminal device according to the outgoing call instruction, where the outgoing call request message carries information about a first account of the first terminal device and information about a second terminal device. The method also includes obtaining, by the wireless support apparatus, a state of the first terminal device and when the state of the first terminal device is an idle state, updating, by the wireless support apparatus, the state of the first terminal device to an outgoing call state according to the outgoing call request message, and occupying a mutex lock. Also, the method includes sending, by the wireless support apparatus, a state change success message to the application processor. Additionally, the method includes sending, by the application processor, the outgoing call request message to a baseband processor of the first terminal device according to the state change success message and sending, by the baseband processor, a call request destined for the second terminal device to a network according to the outgoing call request message.

In a first possible implementation manner, when the wireless support apparatus updates the state of the first terminal device to the outgoing call state according to the outgoing call request message, the method further includes: generating, by the wireless support apparatus, second verification code, where the second verification code includes the information about the first account and the information about the second user equipment.

With reference to the first possible implementation manner of the second aspect, in a second possible implementation manner, the method further includes: when the application processor receives a hang-up instruction used to terminate a call connection between the first terminal device and the second terminal device, sending, by the application processor, a call termination message to the wireless support apparatus, where the call termination message includes the information about the first account and the information about the second terminal device; or when the baseband processor receives a hang-up instruction that is sent by the network and that is used to terminate a call connection between the first terminal device and the second terminal device, sending, by the baseband processor, a call termination message to the wireless support apparatus; generating, by the wireless support apparatus, an outgoing call state release message according to the call termination message, and unlocking the mutex lock; and resetting, by the first terminal device, the state of the first terminal device to the idle state according to the outgoing call state release message and the second verification code.

In a third possible implementation manner, after the wireless support apparatus updates the state of the first terminal device to the outgoing call state according to the outgoing call request message, and occupies the mutex lock, when the baseband processor receives an incoming call request message that is sent by the network and that comes from a third terminal device, the method further includes: sending, by the baseband processor, an incoming call prompt message to the wireless support apparatus according to the incoming call request message; obtaining, by the wireless support apparatus, a state of the first terminal device; when the state of the first terminal device is the outgoing call state, sending, by the wireless support apparatus, incoming call rejection response information to the application processor; and sending, by the application processor, the incoming call rejection response information to the network by using the baseband processor.

With reference to the first possible implementation manner of the second aspect, in a fourth possible implementation manner, after the wireless support apparatus updates the state of the first terminal device to the outgoing call state according to the outgoing call request message, and occupies the mutex lock, when the baseband processor receives an incoming call request message that is sent by the network and that comes from a third terminal device, the method further includes: sending, by the baseband processor, an incoming call prompt message to the wireless support apparatus according to the incoming call request message, where the incoming call prompt message carries the information about the first account of the first terminal device; processing, by the wireless support apparatus, the incoming call prompt message, and when the information about the first account is identified, sending the incoming call prompt message to the application processor; generating, by the application processor, prompt information according to the incoming call request message, so as to prompt the user that an incoming call that comes from the third terminal device is received; when the application processor receives an outgoing call suspension instruction input by the user, sending an outgoing call suspension message to the wireless support apparatus; updating, by the wireless support apparatus, the state of the first terminal device to an outgoing call suspension state according to the outgoing call suspension message, and suspending a call between the first terminal device and the second terminal device; and when the first terminal device is in the outgoing call suspension state, receiving, by the baseband processor, incoming call information of the third terminal device and sending the incoming call information of the third terminal device to the application processor.

With reference to the fourth possible implementation manner of the second aspect, in a fifth possible implementation manner, after the wireless support apparatus updates the state of the first terminal device to the outgoing call suspension state according to the outgoing call suspension instruction, the method further includes: when the application processor receives an outgoing call restoration instruction input by the user, sending an outgoing call restoration message to the wireless support apparatus; and updating, by the wireless support apparatus, the state of the first terminal device to the outgoing call state according to the outgoing call restoration message, and suspending a call between the first terminal device and the third terminal device.

With reference to the fourth or fifth possible implementation manner of the second aspect, in a sixth possible implementation manner, the method further includes: when the application processor receives a hang-up instruction used to terminate a call with the second terminal device, sending, by the application processor, a first call termination message to the wireless support apparatus, where the first call termination message includes the information about the first account and the information about the second terminal device; sending, by the wireless support apparatus, an outgoing call state release message to the first terminal device according to the first call termination message, and unlocking the mutex lock; resetting, by the first terminal device, the state of the first terminal device to the idle state according to the outgoing call state release message and the second verification code; and updating, by the wireless support apparatus, the state of the first terminal device to an incoming call state, occupying the mutex lock, and generating third verification code, where the third verification code includes the information about the first account and information about the third terminal device.

With reference to the fourth or fifth possible implementation manner of the second aspect, in a seventh possible implementation manner, the method further includes: when the application processor receives a hang-up instruction used to terminate a call with the third terminal device, sending, by the application processor, a second call termination message to the wireless support apparatus, where the second call termination message includes the information about the first account and information about the third terminal device; and sending, by the wireless support apparatus, an outgoing call suspension state release message to the first terminal device according to the second call termination message, and changing the state of the first terminal device from the outgoing call suspension state to the outgoing call state.

In an eighth possible implementation manner, when the state of the first terminal device is an incoming call state or an outgoing call state, the method further includes: sending, by the wireless support apparatus, a state change rejection message to the application processor; and rejecting, by the application processor according to the state change rejection message, the outgoing call request message destined for the second terminal device.

According to a third aspect, an embodiment of the present invention provides a first terminal device, including a baseband processor, an application processor, and a wireless support apparatus; where the baseband processor is configured to receive an incoming call request message that is sent by a network and that comes from a second terminal device, where the incoming call request message carries information about a first account of the first terminal device; the baseband processor is further configured to send an incoming call prompt message to the wireless support apparatus according to the incoming call request message, where the incoming call prompt message includes the information about the first account; the wireless support apparatus is configured to obtain a state of the first terminal device; when the state of the first terminal device is an idle state, the wireless support apparatus is further configured to update the state of the first terminal device to an incoming call state according to the incoming call request message, and occupy a mutex lock; the wireless support apparatus is further configured to send a state change success message to the baseband processor; the baseband processor is further configured to send the incoming call request message to the application processor according to the state change success message; and the application processor is configured to prompt a user about incoming call information according to the incoming call request message.

In a first possible implementation manner, when the wireless support apparatus updates the state of the first terminal device to the incoming call state according to the incoming call request message, the wireless support apparatus is further configured to: generate first verification code, where the first verification code includes the information about the first account and information about the second terminal device.

With reference to the first possible implementation manner of the third aspect, in a second possible implementation manner, when the application processor receives a hang-up instruction used to terminate a call with the second terminal device, the application processor is further configured to send a call termination message to the wireless support apparatus, where the call termination message includes the information about the first account and the information about the second terminal device; and the wireless support apparatus is further configured to generate an incoming call state release message according to the call termination message, and unlock the mutex lock, so as to reset the state of the first terminal device to the idle state with reference to the first verification code.

In a third possible implementation manner, when the state of the first terminal device is the incoming call state, the application processor receives an outgoing call instruction input by the user, and the application processor is further configured to send an outgoing call request message to the wireless support apparatus according to the outgoing call instruction; the wireless support apparatus is further configured to obtain a state of the first terminal device; and when the state of the first terminal device is the incoming call state, the wireless support apparatus is further configured to send outgoing call rejection response information to the application processor.

With reference to the third possible implementation manner of the third aspect, in a fourth possible implementation manner, when the baseband processor sends the incoming call prompt message to the wireless support apparatus of the first terminal device according to the incoming call request message, the application processor is further configured to send the outgoing call request message to the wireless support apparatus; and the wireless support apparatus is further configured to obtain pre-stored configuration information of an incoming call/outgoing call priority, and choose, according to the configuration information, to update the state of the first terminal device to the incoming call state or to an outgoing call state.

In a fifth possible implementation manner, when the state of the first terminal device is an incoming call state or an outgoing call state, the wireless support apparatus is further configured to send a state change rejection message to the baseband processor; and the baseband processor is further configured to send, to the network according to the state change rejection message, response information that rejects an incoming call from the second terminal device.

According to a fourth aspect, an embodiment of the present invention provides a first terminal device, including a baseband processor, an application processor, and a wireless support apparatus; where the application processor is configured to receive an outgoing call instruction input by a user; the application processor is further configured to send an outgoing call request message to the wireless support apparatus according to the outgoing call instruction, where the outgoing call request message carries information about a first account of the first terminal device and information about a second terminal device; the wireless support apparatus is configured to obtain a state of the first terminal device; when the state of the first terminal device is an idle state, the wireless support apparatus is further configured to update the state of the first terminal device to an outgoing call state according to the outgoing call request message, and occupy a mutex lock; the wireless support apparatus is further configured to send a state change success message to the application processor; the application processor is further configured to send the outgoing call request message to the baseband processor according to the state change success message; and the baseband processor is configured to send a call request destined for the second terminal device to a network according to the outgoing call request message.

In a first possible implementation manner, when the wireless support apparatus updates the state of the first terminal device to the outgoing call state according to the outgoing call request message, the wireless support apparatus is further configured to: generate second verification code, where the second verification code includes the information about the first account and the information about the second user equipment.

With reference to the first possible implementation manner of the fourth aspect, in a second possible implementation manner, when the application processor receives a hang-up instruction used to terminate a call with the second terminal device, the application processor is further configured to send a call termination message to the wireless support apparatus, where the call termination message includes the information about the first account and the information about the second terminal device; and the wireless support apparatus is further configured to generate an outgoing call state release message according to the call termination message, and unlock the mutex lock, so as to reset the state of the first terminal device to the idle state with reference to the second verification code.

In a third possible implementation manner, after the wireless support apparatus updates the state of the first terminal device to the outgoing call state according to the outgoing call request message, and occupies the mutex lock, when the baseband processor receives an incoming call request message that is sent by the network and that comes from a third terminal device, the baseband processor is further configured to send an incoming call prompt message to the wireless support apparatus according to the incoming call request message; the wireless support apparatus is further configured to obtain a state of the first terminal device; when the state of the first terminal device is the outgoing call state, the wireless support apparatus sends incoming call rejection response information to the application processor; and the application processor is further configured to send the incoming call rejection response information to the network by using the baseband processor.

With reference to the first possible implementation manner of the fourth aspect, in a fourth possible implementation manner, after the wireless support apparatus updates the state of the first terminal device to the outgoing call state according to the outgoing call request message, and occupies the mutex lock, when the baseband processor receives an incoming call request message that is sent by the network and that comes from a third terminal device, the baseband processor is further configured to send an incoming call prompt message to the wireless support apparatus according to the incoming call request message, where the incoming call prompt message carries the information about the first account of the first terminal device; the wireless support apparatus is further configured to process the incoming call prompt message, and when the information about the first account is identified, send the incoming call prompt message to the application processor; the application processor is further configured to generate prompt information according to the incoming call request message, so as to prompt the user that an incoming call that comes from the third terminal device is received; and when the application processor receives an outgoing call suspension instruction input by the user, send an outgoing call suspension message to the wireless support apparatus; the wireless support apparatus is further configured to update the state of the first terminal device to an outgoing call suspension state according to the outgoing call suspension instruction, and suspend a call between the first terminal device and the second terminal device; and when the first terminal device is in the outgoing call suspension state, the baseband processor receives incoming call information of the third terminal device and sends the incoming call information of the third terminal device to the application processor.

With reference to the fourth possible implementation manner of the fourth aspect, in a fifth possible implementation manner, after the wireless support apparatus updates the state of the first terminal device to the outgoing call suspension state according to the outgoing call suspension instruction, when the application processor receives an outgoing call restoration instruction input by the user, the application processor is further configured to send an outgoing call restoration message to the wireless support apparatus; and the wireless support apparatus is further configured to update the state of the first terminal device to the outgoing call state according to the outgoing call restoration instruction, and suspend a call between the first terminal device and the third terminal device.

With reference to the fourth or fifth possible implementation manner of the fourth aspect, in a sixth possible implementation manner, when the application processor receives a hang-up instruction used to terminate a call with the second terminal device, the application processor is further configured to send a first call termination message to the wireless support apparatus, where the first call termination message includes the information about the first account and the information about the second terminal device; the wireless support apparatus is further configured to generate an outgoing call state release message according to the first call termination message, and unlock the mutex lock, so as to reset the state of the first terminal device to the idle state with reference to the second verification code; and the wireless support apparatus is further configured to update the state of the first terminal device to an incoming call state, occupy the mutex lock, and generate third verification code, where the third verification code includes the information about the first account and information about the third terminal device.

With reference to the fourth or fifth possible implementation manner of the fourth aspect, in a seventh possible implementation manner, when the application processor receives a hang-up instruction used to terminate a call with the third terminal device, the application processor is further configured to send a second call termination message to the wireless support apparatus, where the second call termination message includes the information about the first account and information about the third terminal device; and the wireless support apparatus is further configured to generate an outgoing call suspension state release message according to the second call termination message, and change the state of the first terminal from the outgoing call suspension state to the outgoing call state.

In an eighth possible implementation manner, when the state of the first terminal device is an incoming call state or an outgoing call state, the wireless support apparatus is further configured to send a state change rejection message to the application processor; and the application processor is further configured to reject, according to the state change rejection message, the outgoing call request message destined for the second terminal device.

According to the call collision processing method for a terminal device provided in the embodiments of the present invention, a state machine records that a current state of the terminal device is an incoming call state, an outgoing call state, or an idle state. When the terminal device is in the idle state, that the terminal device processes an incoming call or an outgoing call is determined according to occupation of the state machine by incoming call information or by outgoing call information, and a state of the state machine after the state machine is occupied by the incoming call or the outgoing call is protected by using a mutex lock, which provides a stable and reliable processing mechanism, so that the incoming call or the outgoing call can be smoothly performed particularly when the incoming call and the outgoing call simultaneously arrive, thereby improving user experience.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
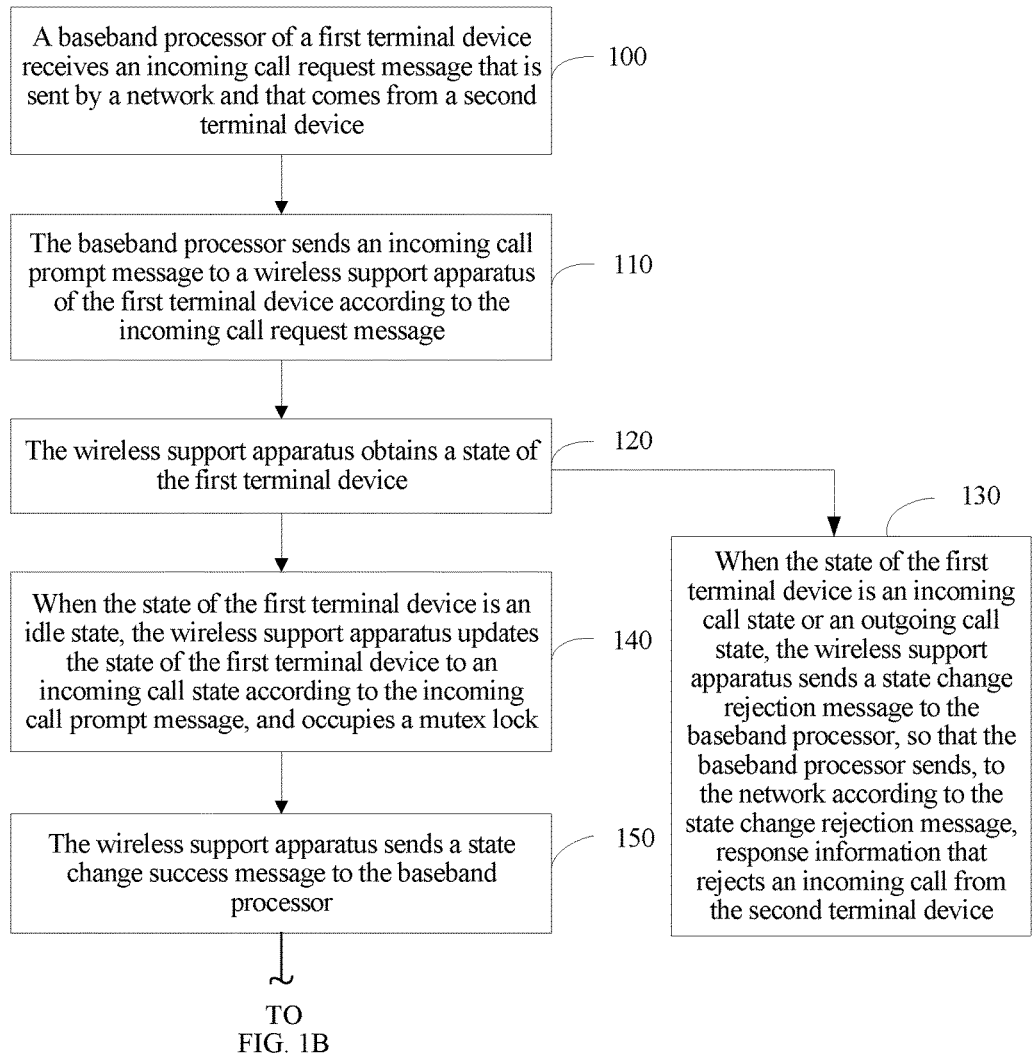
FIG. 1A and FIG. 1B are a flowchart of a call collision processing method for a terminal device according to Embodiment 1 of the present invention.
Figure 1B:
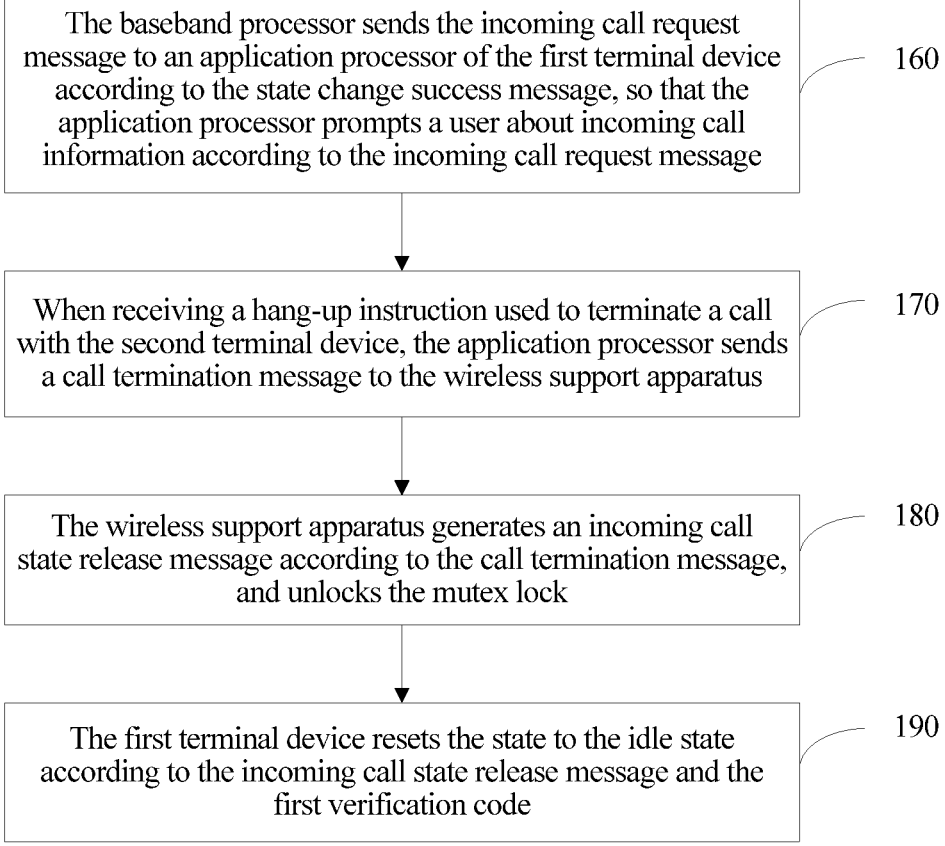

The following uses FIG. 1A and FIG. 1B as an example to describe in detail a call collision processing method for a terminal device according to the present invention. In this embodiment, a scenario in which a first terminal device receives an incoming call is mainly used as an example for description. The first terminal device includes a baseband processor, a wireless support apparatus, and an application processor. The wireless support apparatus includes a state machine. The baseband processor is equivalent to a protocol processor, and is responsible for data processing and storage. Main components of the baseband processor are units such as a digital signal processor (DSP), a microcontroller (MCU), and a memory (static random access memory (SRAM), Flash). Main functions of the baseband processor are baseband encoding/decoding, sound encoding, voice encoding, and the like. The application processor is a multimedia application processing module of a terminal device. A function of the application processor is running an operating system and various application programs. The wireless support apparatus is a communication bridge between the application processor and the baseband processor, and may record whether an account of the first terminal device is in an incoming call state, an outgoing call state, or an idle state by using the state machine.

The method includes the following steps.

Step 100: The baseband processor of the first terminal device receives an incoming call request message that is sent by a network and that comes from a second terminal device, where the incoming call request message carries information about a first account of the first terminal device.

Specifically, the first terminal device may be a smartphone provided with an application processor and a baseband processor, for example, a smartphone with a dual-card single-pass function. Dual cards are respectively corresponding to a first account and a second account that are of a user. The first account and the second account may be respectively two subscriber identity module (SIM) cards. The second terminal device may be a mobile phone, a fixed-line phone, or the like with a call function.

When a user of the second terminal device needs to call a user of the first terminal device, an incoming call request message destined for the first user equipment is initiated by entering information about the first account (certainly, which may be the second account) on the second user equipment.

This incoming call request message is first sent to the network, and then the network forwards the incoming call request message to the baseband processor of the first terminal device for receiving.

Step 110: The baseband processor sends an incoming call prompt message to the wireless support apparatus of the first terminal device according to the incoming call request message.

Specifically, when receiving the incoming call request message from the second user equipment, the baseband processor generates the incoming call prompt message and sends the incoming call prompt message to the wireless support apparatus in the first terminal device. The incoming call prompt message includes the information about the first account. In the present invention, the wireless support apparatus refers to a radio interface layer (RIL).

The RIL operates under the Point-to-Point Protocol (PPP) and the Transmission Control Protocol/Internet Protocol (TCP/IP protocol), and is responsible for reliable data transmission, AT (Attention) command (a modem command language) sending, and response parsing. Certainly, in addition to supporting a network, the RIL also supports functions such as a short message service, and a voice call.

In other words, the RIL can provide a service related to wireless communication for an application program that runs in an application processor, including a function such as call control, a short message, or a general packet radio service (GPRS). For an upper-layer application program, the RIL may be abstractly considered as a logical device, and a required service can be obtained only by communicating with the RIL.

Step 120: The wireless support apparatus obtains a state of the first terminal device.

Specifically, the wireless support apparatus includes a state machine, and therefore, may record whether the first account or the second account of the first terminal device is in the incoming call state, the outgoing call state, or the idle state by using the state machine. The state machine records a state of the terminal device according to different trigger conditions. The processors execute different processing according to different states of the state machine.

When receiving the incoming call request message, the wireless support apparatus first detects the state of the first terminal device, and determines whether the first account or the second account is already in the incoming call state or the outgoing call state.

If the first account or the second account of the first terminal device is already in the incoming call state or the outgoing call state, step 130 is performed. If both the first account and the second account that are of the first terminal device are in the idle state, the following step 140 is performed.

Step 130: When the state of the first terminal device is the incoming call state or the outgoing call state, the wireless support apparatus sends a state change rejection message to the baseband processor, so that the baseband processor sends, to the network according to the state change rejection message, response information that rejects an incoming call from the second terminal device.

Specifically, in an actual application, the state machine may separately record the incoming call state or the outgoing call state for the first account and the second account, for example, may record the outgoing call state of the first account as a sub0/MO call, record the incoming call state of the first account as a sub0/MT call, record the outgoing call state of the second account as a sub1/MO call, and record the incoming call state of the second account as a sub1/MT call.

Step 140: When the state of the first terminal device is the idle state, the wireless support apparatus updates the state of the first terminal device to the incoming call state according to the incoming call prompt message, and occupies a mutex lock.

Specifically, when it is determined that the state machine is in the idle state, the RIL updates the state of the first terminal device to the incoming call state according to the incoming call request message destined for the first account.

In the present invention, when the first terminal device is in the incoming call state or the outgoing call state, the mutex lock is used to prevent a case in which another incoming call or outgoing call occupies a communication resource (excluding allowance for incoming call waiting herein) in the current incoming call state or the outgoing call state.

Therefore, when the RIL updates the state of the state machine, for example, updates the state to the incoming call state, the RIL further generates first verification code, and sends the first verification code to the state machine. The first verification code includes the information about the first account and information about the second terminal device.

Step 150: The wireless support apparatus sends a state change success message to the baseband processor.

Specifically, after updating the state of the first terminal device, the RIL sends the state change success message to the baseband processor.

Step 160: The baseband processor sends the incoming call request message to the application processor of the first terminal device according to the state change success message, so that the application processor prompts a user about incoming call information according to the incoming call request message.

Specifically, after receiving the state change success message, the baseband processor sends the incoming call request message that comes from the second terminal device to the application processor.

After receiving the incoming call request message, the application processor prompts the user about the incoming call information that comes from the second terminal device.

If the user chooses to answer an incoming call according to a prompt, a voice path between the first terminal device and the second terminal device is established over the network.

If the user rejects to answer an incoming call according to a prompt, or when a user of either of the first terminal device or the second terminal device hangs up a call after the voice path is established, the method further includes:

Step 170: When receiving a hang-up instruction used to terminate a call with the second terminal device, the application processor sends a call termination message to the wireless support apparatus.

Specifically, the hang-up instruction received by the application processor may be an answer rejection instruction input by the user of the first terminal device serving as a called party, or may be a call hang-up instruction input by the user at any time after the call is established, or may further be a hang-up instruction forwarded by the baseband processor. The hang-up instruction of the baseband processor may be call hang-up instruction information that is sent by the network, that is received by the second terminal device, and that is input by the user of the second terminal device.

No matter from which party the hang-up instruction is received, the call termination message is generated according to the instruction, and is sent to the RIL.

Step 180: The wireless support apparatus generates an incoming call state release message according to the call termination message, and unlocks the mutex lock.

Specifically, when receiving the call termination message, the RIL generates the incoming call state release message, so as to release the locked incoming call state recorded by the state machine.

Step 190: The first terminal device resets the state to the idle state according to the incoming call state release message and the first verification code.

Specifically, the state machine is reset according to the incoming call state release message of the RIL and the first verification code.

In a reset process, the state recorded by the state machine is first updated to a call termination state, after a memory occupied by the call connection is released, and resetting of a relevant parameter in the first terminal device is completed, the state recorded by the state machine is updated to the idle state, and the first verification code is set to be invalid. For example, the first verification code may be specifically reset to 0.

In the foregoing process, some cases may be further included.

For example, after the foregoing step 140 in which the wireless support apparatus updates the state of the first terminal device to the incoming call state according to the incoming call prompt message, and occupies the mutex lock (in this case, the incoming call prompt message has not been sent to the application processor, or establishment of the voice path has not been completed), the application processor receives an outgoing call instruction input by the user of the first terminal device, and the application processor sends an outgoing call request message to the RIL according to the outgoing call instruction; the RIL detects a state of the first terminal device according to the outgoing call request message; and when detecting that the first terminal device is already in the incoming call state, the RIL sends outgoing call rejection response information to the application processor.

In addition, the application processor further releases a memory occupied by the outgoing call request message and a relevant parameter.

For another example, during step no in which the baseband processor sends the incoming call prompt message to the wireless support apparatus of the first terminal device, the application processor sends the outgoing call request message to the wireless support apparatus at the same time, and the wireless support apparatus obtains pre-stored configuration information of an incoming call/outgoing call priority, where the configuration information is used to stipulate a rule in which an incoming call or an outgoing call is selected to be preferentially processed when the incoming call and the outgoing call simultaneously arrive at the RIL; and the wireless support apparatus chooses, according to the configuration information, to update the state of the first terminal device to the incoming call state or to the outgoing call state.

In Embodiment 1 of the present invention, a scenario in which a first terminal device receives an incoming call request message from a second terminal device is used as an example to describe a call collision processing method according to the present invention.

When receiving the incoming call request message, the first terminal device first determines whether a current state, of the first terminal device, recorded by a state machine in the first terminal device is an idle state; and when the first terminal device is in the idle state, updates the state of the first terminal device to an incoming call state according to the incoming call request message, and protects the incoming call state by using a mutex lock; or if the current state of the first terminal device is not the idle state, rejects the incoming call request. This embodiment of the present invention provides a stable and reliable call collision processing method, which can effectively ensure that one of an incoming call or an outgoing call can be smoothly performed if the incoming call collides with the outgoing call, thereby improving user experience.

Figure 2A:
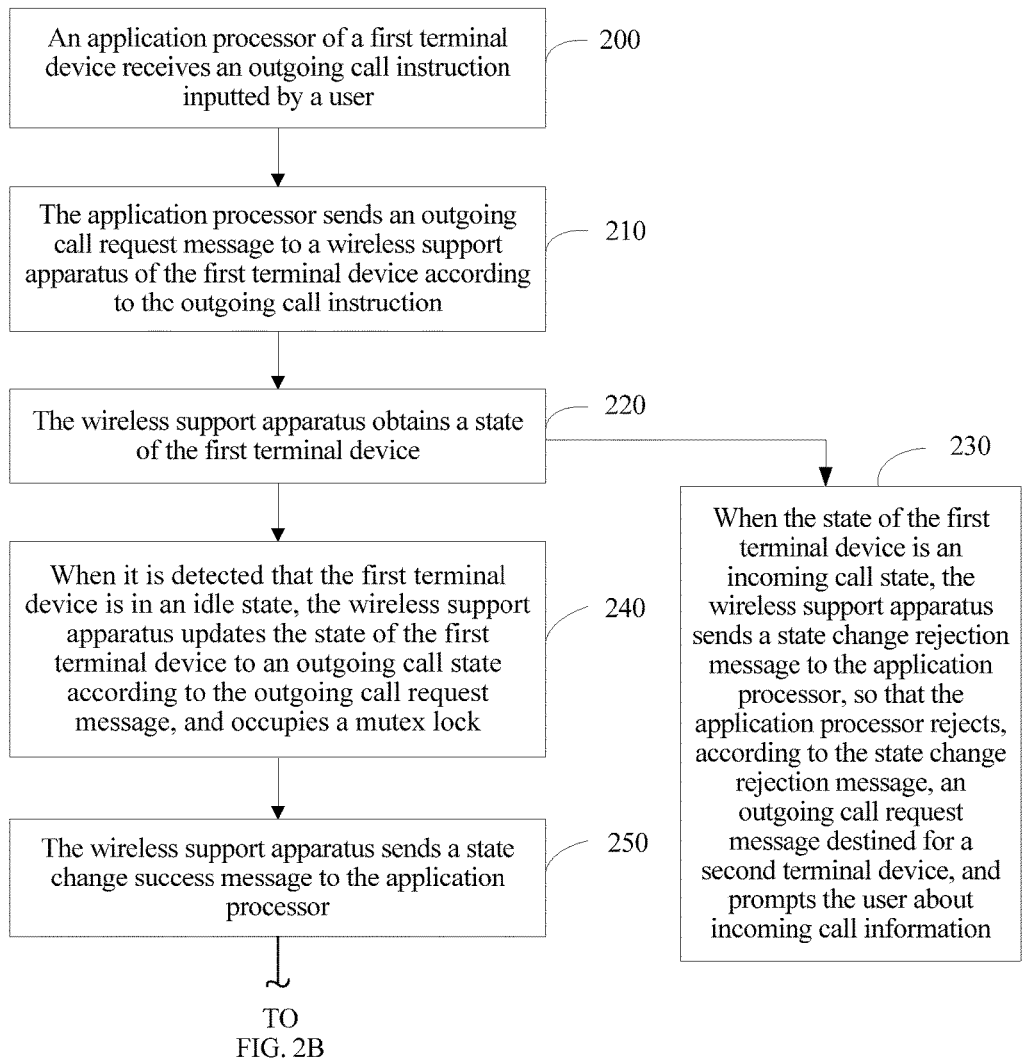
FIG. 2A and FIG. 2B are a flowchart of a call collision processing method for another terminal device according to Embodiment 2 of the present invention.
Figure 2B:
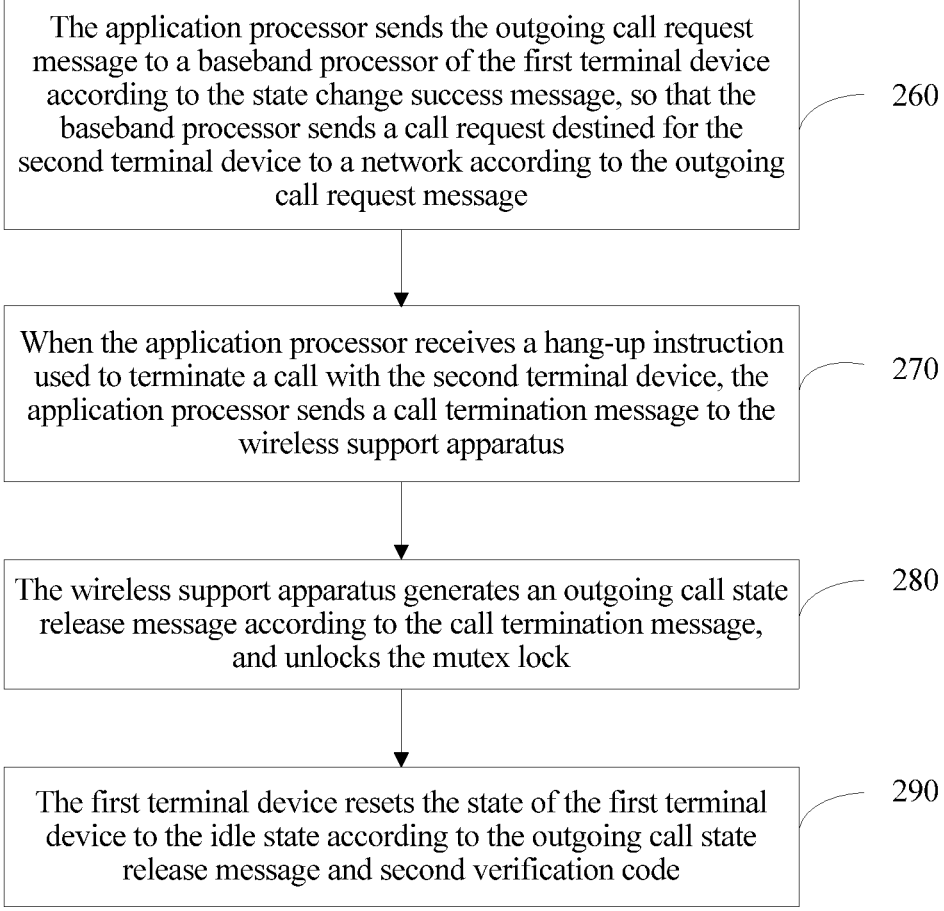

The following uses FIG. 2A and FIG. 2B as an example to describe in detail a call collision processing method according to the present invention. In this embodiment, a scenario in which a first terminal device performs an outgoing call is mainly used as an example for description. The method includes the following steps:

Step 200: An application processor of the first terminal device receives an outgoing call instruction input by a user.

Specifically, when performing an outgoing call, the first terminal device first needs to receive an outgoing call instruction input by a user. The outgoing call instruction is received by using an input device of the first terminal device, and is sent to the application processor.

The input device may include a touchscreen, a keyboard, a microphone, and the like that are of the first terminal device.

Step 210: The application processor sends an outgoing call request message to a wireless support apparatus of the first terminal device according to the outgoing call instruction.

Specifically, when receiving the outgoing call instruction, the application processor generates the outgoing call request message according to the outgoing call instruction, and sends the outgoing call request message to the wireless support apparatus in the first terminal device. The outgoing call request message carries information about a first account of the first terminal device and information about a second terminal device.

Same as the foregoing embodiment, the wireless support apparatus refers to an RIL.

Step 220: The wireless support apparatus obtains a state of the first terminal device.

Specifically, the wireless support apparatus includes a state machine, and records whether the first account or a second account of the first terminal device is in an incoming call state, an outgoing call state, or an idle state by using the state machine. It should be noted that when the first terminal device is already in an outgoing call initiation state or is already in the outgoing call state, the user cannot initiate another outgoing call request by using the first terminal device. That is, when the first terminal device receives the outgoing call instruction input by the user, normally, the state, of the first terminal device, recorded by the state machine may not be in the outgoing call state. Therefore, generally, there is no need to discuss whether the first terminal device is in the outgoing call state. However, a case in which an exception occurs on the state machine cannot be excluded, and a possibility that the first terminal device is in the outgoing call state exists. Subsequently, the incoming call state and the idle state are mainly discussed.

When receiving the outgoing call request message, the wireless support apparatus first determines the state of the first terminal device, so as to determine whether the first account or the second account is already in an incoming call state.

If the first account or the second account of the first terminal device is already in the incoming call state, step 230 is performed. If the first account or the second account of the first terminal device is in the idle state, the following step 240 is performed.

Step 230: When the state of the first terminal device is an incoming call state, the wireless support apparatus sends a state change rejection message to the application processor, so that the application processor rejects, according to the state change rejection message, the outgoing call request message destined for a second terminal device, and prompts the user about incoming call information.

Specifically, both a process of prompting the user about the incoming call information and a process of processing an incoming call are described according to the incoming call scenario in the foregoing embodiment, and are not described herein.

Step 240: When it is detected that the first terminal device is in an idle state, the wireless support apparatus updates the state of the first terminal device to an outgoing call state according to the outgoing call request message, and occupies a mutex lock.

Specifically, when it is determined that the first terminal device is in the idle state, the RIL updates the state of the first terminal device to the outgoing call state according to the outgoing call request message sent to the second terminal device by using the first account to the second terminal device.

In the present invention, that the first terminal device is in the incoming call state or the outgoing call state is recorded by using the state machine, and the mutex lock is used to prevent a case in which another incoming call or outgoing call occupies a communication resource in the current incoming call state or the outgoing call state. Processing of an incoming call is independently described in the following when incoming call waiting is allowed in the outgoing call state.

Therefore, when the RIL updates the state machine, for example, the state is updated to that the first terminal device is in the outgoing call state, the RIL further generates second verification code. The second verification code includes the information about the first account and the information about the second terminal device.

Step 250: The wireless support apparatus sends a state change success message to the application processor.

Specifically, after updating the state of the first terminal device, the RIL sends the state change success message to the application processor.

Step 260: The application processor sends the outgoing call request message to a baseband processor of the first terminal device according to the state change success message, so that the baseband processor sends, according to the outgoing call request message, a call request destined for the second terminal device to a network.

Specifically, after receiving the state change success message, the application processor sends the outgoing call request message to the baseband processor. The outgoing call request message is sent to the network by using the baseband processor. A voice path between the first terminal device and the second terminal device is established over the network.

If a user of the second terminal device rejects an incoming call request message, or a user of either of the first terminal device or the second terminal device hangs up a call after the voice path is established, the method further includes:

Step 270: When the application processor receives a hang-up instruction used to terminate a call with the second terminal device, the application processor sends a call termination message to the wireless support apparatus.

Specifically, the hang-up instruction received by the application processor may be an answer rejection instruction input by the user of the first terminal device serving as a called party, or may be a call hang-up instruction input by the user at any time after the call is established, or may further be a hang-up instruction forwarded by the baseband processor. The hang-up instruction of the baseband processor may be call hang-up instruction information that is sent by the network, that is received by the second terminal device, and that is input by the user of the second terminal device.

No matter from which party the hang-up instruction is received, the call termination message is generated according to the instruction, and is sent to the RIL.

Step 280: The wireless support apparatus generates an outgoing call state release message according to the call termination message, and unlocks the mutex lock.

Specifically, when receiving the call termination message, the RIL generates the incoming call state release message, so as to release the locked outgoing call state recorded by the state machine.

Step 290: The first terminal device resets the state of the first terminal device to the idle state according to the outgoing call state release message and the second verification code.

Specifically, the state machine is reset according to the outgoing call state release message of the RIL and the second verification code.

In a reset process, the state recorded by the state machine is first updated to a call termination state, after a memory occupied by the call connection is released, and resetting of a relevant parameter in the first terminal device is completed, the state recorded by the state machine is updated to the idle state, and the second verification code is set to be invalid. For example, the second verification code may be specifically reset to 0.

In the foregoing process, some cases may be further included.

For example, after step 240 in which the wireless support apparatus updates the state of the first terminal device to the outgoing call state according to the outgoing call request message, and occupies the mutex lock, the baseband processor receives an incoming call request message that is sent by the network and that comes from a third terminal device. In this case, a solution to incoming call processing is determined according to whether the application processor of the first terminal device has incoming call waiting configuration information. The incoming call waiting configuration information is preset by the user, and is stored in the first terminal device. The configuration information can be obtained by using the application processor.

At least the following three specific solutions are included.

In a first solution, the incoming call waiting configuration information is not stored in the application processor, and a processing method is as follows:

The baseband processor receives the incoming call request message that is sent by the network and that comes from the third terminal device, and sends an incoming call prompt message to the wireless support apparatus. The wireless support apparatus detects a state of the first terminal device according to the incoming call prompt message. When detecting that the first terminal device is in the outgoing call state, the wireless support apparatus sends incoming call rejection response information to the application processor. The application processor sends the incoming call rejection response information to the network by using the baseband processor, so as to send the incoming call rejection response information to the third terminal device.

In a second solution, the incoming call waiting configuration information is stored in the application processor, and the incoming call request message is destined for the first account used for performing an outgoing call, and a processing method is as follows:

The baseband processor generates an incoming call prompt message according to the incoming call request message, and sends the incoming call prompt message to the wireless support apparatus, where the incoming call prompt message carries the information about the first account of the first terminal device. The wireless support apparatus processes the incoming call prompt message, and when the information, about the first account, same as that in the outgoing call instruction is identified, sends the incoming call prompt message to the wireless support apparatus. When detecting that the first terminal device is in the outgoing call state, the wireless support apparatus sends the incoming call prompt message to the application processor. The application processor generates prompt information according to the incoming call prompt message, so as to prompt the user that an incoming call that comes from the third terminal device is received. When receiving an outgoing call suspension instruction input by the user, the application processor sends the outgoing call suspension instruction to the wireless support apparatus. The wireless support apparatus updates the state of the first terminal device to an outgoing call suspension state according to the outgoing call suspension instruction, and temporarily suspends a call between the first terminal device and the second terminal device. When the first terminal device is in the outgoing call suspension state, the application processor receives incoming call information of the third terminal device that is received by the baseband processor and that is sent by the network, and receives and sends information that is input by the user and that is sent to the third terminal device.

Further, in the outgoing call suspension state, when receiving an outgoing call restoration instruction input by the user, the application processor generates an outgoing call restoration instruction message, and sends the outgoing call restoration instruction message to the wireless support apparatus. The wireless support apparatus re-updates the state of the first terminal device to the outgoing call state according to the outgoing call restoration instruction message, and temporarily suspends a call between the first terminal device and the third terminal device.

When receiving a hang-up instruction used to terminate the call with the second terminal device, the application processor sends a call termination message to the wireless support apparatus. The wireless support apparatus generates an outgoing call state release message according to the call termination message, and unlocks the mutex lock, so as to reset the state of the first terminal device to the idle state according to the outgoing call state release message and the second verification code.

Because the incoming call has not ended, the wireless support apparatus subsequently updates the state of the first terminal device to the incoming call state, occupies the mutex lock, and generates third verification code, where the third verification code includes the information about the first account and information about the third terminal device. A subsequent process of processing the incoming call has been described in detail in the foregoing embodiment, and is not described herein.

In addition, a case in which a voice path between the first terminal device and the third terminal device is first disconnected may further exist.

In this case, the application processor receives a hang-up instruction used to terminate a call with the third terminal device, generates a call termination message, and sends the call termination message to the wireless support apparatus. The wireless support apparatus re-updates the state of the first terminal device from the outgoing call suspension state to the outgoing call state according to the call termination message, so as to continue to connect the voice path between the first terminal device and the second terminal device.

In a third solution, the incoming call waiting configuration information is stored in the application processor, but the incoming call request message is not destined for the first account used for performing an outgoing call, but is destined for the second account, and a processing method is as follows:

The baseband processor sends an incoming call prompt message to the wireless support apparatus according to the received incoming call request message, where the incoming call prompt message carries information about the second account of the first terminal device. The wireless support apparatus processes the incoming call prompt message, and when the information, about the first account, same as that in the outgoing call instruction cannot be identified, or it is identified that information, about an account, different from that in the outgoing call request message is carried in the incoming call prompt message, rejects an incoming call request to the second account. The baseband processor further releases a memory occupied by the incoming call request and a relevant parameter.

In the second embodiment of the present invention, a scenario in which a first terminal device actively calls a second terminal device is used as an example to describe a call collision processing method according to the present invention.

When receiving an outgoing call request message input by a user, the first terminal device first determines whether a current state of the first terminal device that is recorded by a state machine in the first terminal device is an idle state; and when the first terminal device is in the idle state, updates the state of the first terminal device to an outgoing call state according to the outgoing call request message, and protects the outgoing call state by using a mutex lock; or if the current state of the first terminal device is not the idle state, rejects the outgoing call request. If an incoming call is received when the first terminal device is in the outgoing call state, the incoming call is processed according to whether incoming call waiting is set. If no incoming call waiting is set or account information carried in an incoming call request message does not match information about an account that is performing an outgoing call, the incoming call is directly rejected; or if the incoming call waiting is set and the account information of the incoming call request message matches the information about the account that is performing an outgoing call, the incoming call and the outgoing call may be switched, so as to implement, in a different state of the first terminal device, voice communication with a terminal device that performs an incoming call or voice communication with a terminal device that performs an outgoing call. This embodiment of the present invention provides a stable and reliable call collision processing mechanism, which can improve user experience.

Accordingly, an embodiment of the present invention further provides a terminal device, so as to implement the method described in the foregoing Embodiment 1.

Figure 3:
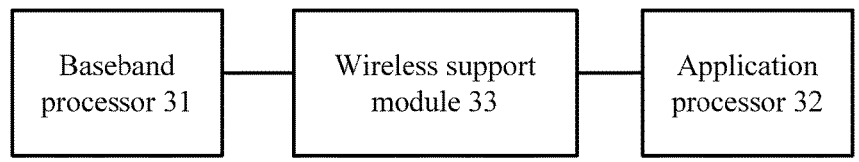
FIG. 3 is a schematic structural diagram of a terminal device according to Embodiment 3 of the present invention.

The terminal device in this embodiment may be specifically a smartphone, and particularly, a smartphone with a dual-card single-pass function. That is, the terminal device in this embodiment includes two accounts that may perform a call, which are a first account and a second account respectively. To distinguish between the terminal device of the present invention and another terminal device that communicates with the terminal device of the present invention, the terminal device of the present invention is referred to as a first terminal device. As shown in FIG. 3, the first terminal device includes a baseband processor 31, an application processor 32, and a wireless support module 33.

The baseband processor 31 is an important part of a mobile phone, is equivalent to a protocol processor, and is responsible for data processing and storage. Main components of the baseband processor 31 are units such as a digital signal processor (DSP), a microcontroller (MCU), and a memory (SRAM, Flash). Main functions of the baseband processor 31 are baseband encoding/decoding, sound encoding, voice encoding, and the like. In a highly integrated baseband processor 31, the baseband processor 31 may be specifically a highly complex System-On-a-Chip (SoC), which can not only support several communications standards, but also provide a multimedia function, and be used in a multimedia display, an image sensor, and an interface related to an audio device. In a terminal device such as a mobile phone, a baseband processor, a radio frequency, and another peripheral chip are used as a module to become a GSM/GPRS modem, so as to provide an AT command interface.

A full name of the application processor 32 is referred to as a multimedia application processor (MAP). A function of the application processor 32 is running an operating system and various application programs.

The wireless support apparatus 33 refers to an RIL. The RIL operates under the PPP and TCP/IP protocols, and is responsible for reliable data transmission, AT command sending, and response parsing. Certainly, in addition to supporting a network, the RIL also supports functions such as a short message service, and a voice call. The wireless support apparatus 33 is a communication bridge between the baseband processor 31 and the application processor 32. A state machine (not shown in the figure) is disposed in the wireless support apparatus 33, is a module of software virtualization, and is configured to record a call state of the terminal device, for example, the state machine may record an outgoing call state of the first account in the terminal device as a sub0/mobile originating (MO) call, record an incoming call state of the first account as a sub0/mobile terminating (MT) call, record an outgoing call state of the second account as a sub1/MO call, and record an incoming call state of the second account as a sub1/MT call. The state machine records a state of the terminal device according to different trigger conditions. The application processor 32 and the baseband processor 31 execute different processing according to different states of the state machine.

The baseband processor 31 is configured to receive an incoming call request message that is sent by a network and that comes from a second terminal device, where the incoming call request message carries information about the first account of the first terminal device.

The baseband processor 31 is further configured to send an incoming call prompt message to the wireless support apparatus 33 of the terminal device according to the incoming call request message, where the incoming call prompt message includes the information about the first account.

The wireless support apparatus 33 is configured to obtain a state of the first terminal device.

When the state of the first terminal device is an idle state, the wireless support apparatus 33 is further configured to update the state of the first terminal device to an incoming call state according to the incoming call request message, and occupy a mutex lock.

The wireless support apparatus 33 is further configured to send a state change success message to the baseband processor 31.

The baseband processor 31 is further configured to send the incoming call request message to the application processor 32 according to the state change success message.

The application processor 32 is configured to prompt a user about incoming call information according to the incoming call request message.

When the wireless support apparatus 33 updates the state of the first terminal device to the incoming call state according to the incoming call request message, the wireless support apparatus 33 is further configured to: generate first verification code, where the first verification code includes the information about the first account and information about the second terminal device.

When the application processor 32 receives a hang-up instruction used to terminate a call with the second terminal device, the application processor 32 is further configured to send a call termination message to the wireless support apparatus 33, where the call termination message includes the information about the first account and the information about the second terminal device; and the wireless support apparatus 33 is further configured to generate an incoming call state release message according to the call termination message, and unlock the mutex lock, so as to reset the state of the first terminal device to the idle state with reference to the first verification code.

After the state is reset to the idle state, the first verification code further needs to be set to be invalid.

In addition, after the state of the first terminal device has been updated to the incoming call state, the application processor 32 receives an outgoing call instruction input by the user, and the application processor 32 is further configured to send an outgoing call request message to the wireless support apparatus 33 according to the outgoing call instruction; the wireless support apparatus 33 is further configured to obtain a state of the first terminal device; and when the wireless support apparatus 33 detects that the first terminal device is in the incoming call state, the wireless support apparatus 33 is further configured to send outgoing call rejection response information to the application processor 32.

In addition, there is another special case in which an incoming call and an outgoing call simultaneously arrive at the wireless support apparatus 33. That is, when the baseband processor 31 sends the incoming call prompt message to the wireless support apparatus 33, the application processor 32 is further configured to send the outgoing call request message to the wireless support apparatus 33; and the wireless support apparatus 33 is further configured to obtain pre-stored configuration information of an incoming call/outgoing call priority, and choose, according to the configuration information, to update the state of the first terminal device to the incoming call state or to the outgoing call state.

The foregoing describes a case in which a state of the first terminal device is determined as the idle state by means of detection. When the wireless support apparatus 33 detects that the first terminal device is in the incoming call state or the outgoing call state according to the incoming call prompt message, the wireless support apparatus 33 is further configured to send a state change rejection message to the baseband processor 31; and the baseband processor 31 is further configured to send, to the network according to the state change rejection message, response information that rejects an incoming call from the second terminal device.

A detailed working process of the baseband processor 31, the application processor 32, and the wireless support apparatus 33 that are included in the foregoing apparatus in a scenario of receiving an incoming call from the second terminal device has been described in detail in the foregoing corresponding method embodiment, and is not described herein.

When receiving an incoming call request message, the terminal device provided in this embodiment first determines whether a current state of a first terminal device that is recorded by a state machine in the first terminal device is an idle state; and when the first terminal device is in the idle state, updates the state of the first terminal device to an incoming call state according to the incoming call request message, and protects the incoming call state by using a mutex lock; or if the current state of the first terminal device is not the idle state, rejects the incoming call request message. This embodiment of the present invention provides a stable and reliable terminal device, which can effectively ensure that one of an incoming call or an outgoing call can be smoothly performed if the incoming call collides with the outgoing call, thereby improving user experience.

An embodiment of the present invention further provides an entity architecture of a terminal device. In addition to including the baseband processor, the application processor, and the wireless support apparatus that are described above, the entity architecture may further include another part, and specifically, may be shown in FIG. 4.

Figure 4:
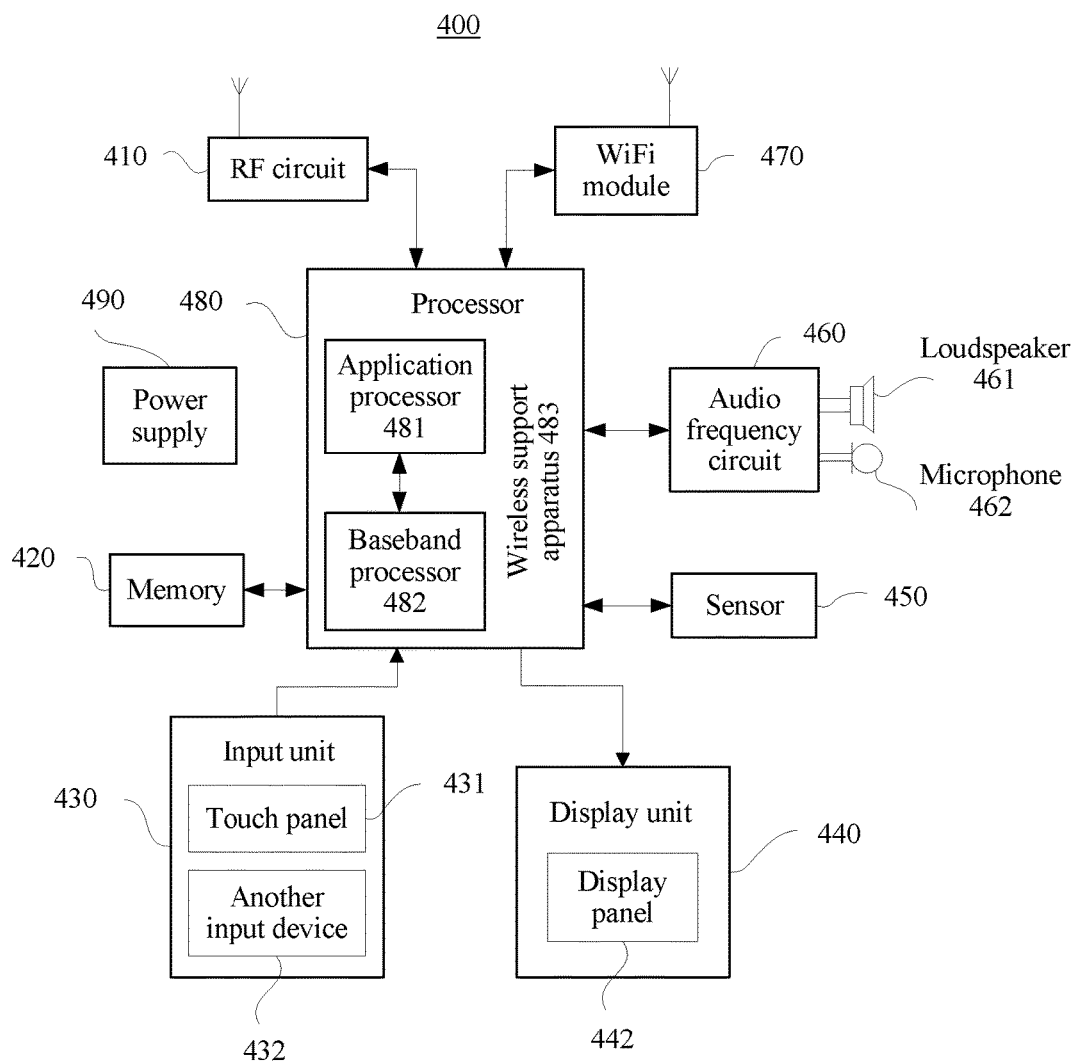
FIG. 4 is a schematic structural diagram of a terminal device entity according to Embodiment 4 of the present invention.

As shown in FIG. 4, a mobile phone is used as an example to describe the terminal device of the present invention in detail in this embodiment.

It should be understood that, a mobile phone 40 shown in the figure is merely an example of a mobile terminal, and the mobile phone 400 may have more or fewer parts than those shown in the figure, and may combine two or more parts, or may have different part configurations. Various parts shown in the figure may be implemented in hardware that includes one or more signal processing and/or application-specific integrated circuits, software, or a combination of hardware and software.

FIG. 4 shows a block diagram of an entity structure of the mobile phone 400 related to this embodiment of the present invention. Referring to FIG. 4, the mobile phone 400 includes parts such as a radio frequency (Radio Frequency, RF) circuit 410, a memory 420, an input unit 430, a display unit 440, a sensor 450, an audio frequency circuit 460, a wireless fidelity (wireless fidelity, WiFi) module 470, a processor 480, and a power supply 490. A person skilled in the art may understand that a structure of the mobile phone shown in FIG. 4 constitutes no limitation on the mobile phone, and may include more or fewer parts than those shown in the figure, or combine some parts, or have different part arrangements.

The following describes each integral part of the mobile phone 400 in detail with reference to FIG. 4.

The RF circuit 410 may be configured to receive and send a signal in an information receiving or sending process or a call process, and particularly, after receiving downlink information of a base station, send the downlink information to the processor 480 for processing; and in addition, send designed uplink data to the base station. Generally, the RF circuit 410 includes but is not limited to an antenna, at least one amplifier, a transceiver, a coupler, a low noise amplifier (Low Noise Amplifier, LNA), a duplexer, and the like. In addition, the RF circuit 410 may further communicate with a network and another device by means of wireless communication. The wireless communication may use any communications standard or protocol, which includes but is not limited to the Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), and the like.

The memory 420 may be configured to store a software program and a module. The processor 480 runs the software program and the module that are stored in the memory 420 to execute various function applications of the mobile phone 400 and data processing. The memory 420 may mainly include a program storage area and a data storage area. The program storage area may store an operating system, an application program required by at least one function (such as a sound play function or an image play function), and the like. The data storage area may store data (such as audio data or a phonebook) and the like that are created according to use of the mobile phone 400. In addition, the memory 420 may include a high-speed random access memory, and may further include a nonvolatile memory such as at least one magnetic disk storage component, a flash memory component, or another volatile solid-state storage component.

The input unit 430 may be configured to receive input digit or character information, and generate key signal input related to user settings and function control of the mobile phone 400. Specifically, the input unit 430 may include a touch panel 431 and another input device 432. The touch panel 431, which is also referred to as a touchscreen, may collect a touch operation (for example, an operation of a user on the touch panel 431 or near the touch panel 431 by using any proper object or accessory such as a finger or a stylus) of a user on or near the touch panel 431, and drive a corresponding connection apparatus according to a preset program. Optionally, the touch panel 431 may include two parts: a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into touch point coordinates, sends the touch point coordinates to the processor 480, and can receive and execute a command sent by the processor 480. In addition, the touch panel 431 may be implemented by using multiple types such as a resistive type, a capacitive type, an infrared ray, and a surface acoustic wave. In addition to the touch panel 431, the input unit 430 may further include the another input device 432. Specifically, the another input device 432 may include but is not limited to one or more of a physical keyboard, a function key (for example, a volume control key or a power on/off key), a trackball, a mouse, an operating lever, or the like.

The display unit 440 may be configured to display information input by a user or information provided for a user, and various menus of the mobile phone 400. The display unit 440 may include a display panel 441. Optionally, the display panel 441 may be configured in a form such as a liquid crystal display (Liquid Crystal Display, LCD) or an organic light-emitting diode (Organic Light-Emitting Diode, OLED). Further, the touch panel 431 may cover the display panel 441. When detecting a touch operation on or near the touch panel 431, the touch panel 431 transfers the touch operation to the processor 480, so as to determine a type of a touch event, and then the processor 480 provides corresponding visual output on the display panel 441 according to the type of the touch event. Although the touch panel 431 and the display panel 441 in FIG. 4 are used as two independent parts to implement input and input functions of the mobile phone 400, in some embodiments, the touch panel 431 and the display panel 441 may be integrated to implement the input and output functions of the mobile phone 400.

The mobile phone 400 may further include at least one sensor 450 such as an optical sensor, a motion sensor, or another sensor. Specifically, the optical sensor may include an environment optical sensor and a proximity sensor. The environment optical sensor may adjust brightness of the display panel 441 according to brightness or dimness of environment light. The proximity sensor may close the display panel 441 and/or backlight when the mobile phone 400 is moved to an ear. As one type of the motion sensor, an accelerometer sensor may detect an acceleration value in each direction (generally three axes), may detect a value and a direction of gravity in a static mode, and may be used for an application that identifies a mobile phone posture (such as a switch between landscape and portrait screens, a relevant game, and magnetometer posture calibration), a function related to vibration identification (such as a pedometer or a knock), and the like. The another sensor such as a gyroscope, a barometer, a hygrometer, a thermometer, or an infrared sensor may be further disposed on the mobile phone 400, which is not described herein.

The audio frequency circuit 460, a loudspeaker 461, and a microphone 462 may provide an audio interface between a user and the mobile phone 400. The audio frequency circuit 460 may transmit, to the loudspeaker 461, an electrical signal converted from received audio data, and the loudspeaker 461 converts the electrical signal into a sound signal for output; in another aspect, the microphone 462 converts a collected sound signal into an electrical signal, the audio frequency circuit 460 receives and converts the electrical signal into audio data, and then outputs the audio data to the RF circuit 408, so as to send the audio data to, for example, another mobile phone, or output the audio data to the memory 420 for further processing. WiFi belongs to a short-distance radio transmission technology. The mobile phone 400 may help, by using the WiFi module 470, a user receive and send an email, browse a web page, access streaming media, and the like. The WiFi module 470 provides the user with wireless broadband Internet access. Although FIG. 4 shows the WiFi module 470, it may be understood that the WiFi module 470 is not a mandatory part of the mobile phone 400, and may be completely omitted according to a need without changing the essence scope of the present invention.

The processor 480 is a control center of the mobile phone 400, uses various interfaces and lines to connect all parts of the entire mobile phone, and runs or executes a software program and/or a module that are/is stored in the memory 420 and invokes data stored in the memory 420 to execute various functions of the mobile phone 400 and data processing, so as to perform overall monitoring on the mobile phone. An application processor 481 and a baseband processor 482 are integrated into the processor 480. The application processor 481 mainly processes an operating system, a user interface, an application program, and the like. The baseband processor 482 mainly processes wireless communication. It may be understood that the foregoing baseband processor 482 may be not integrated into the processor 480, and the baseband processor 482 and the application processor 481 are used as two independent processors and are separately disposed. Communication between the baseband processor 482 and the application processor 481 is implemented by using a wireless support apparatus 483 (RIL). The wireless support apparatus 483 includes a state machine of software virtualization, which is configured to record a call state of the mobile phone 400.

The mobile phone 400 further includes the power supply 490 (for example, a battery) that supplies power to each part. Preferably, the power supply may be logically connected to the processor 480 by using a power supply management system, so as to implement functions such as charging, discharging, and power consumption by using the power supply management system.

Although not shown, the mobile phone 400 may further include a camera, a Bluetooth module, and the like, which are not described herein.

Accordingly, an embodiment of the present invention further provides a terminal device, so as to implement the method described in the foregoing Embodiment 2.

Figure 5:
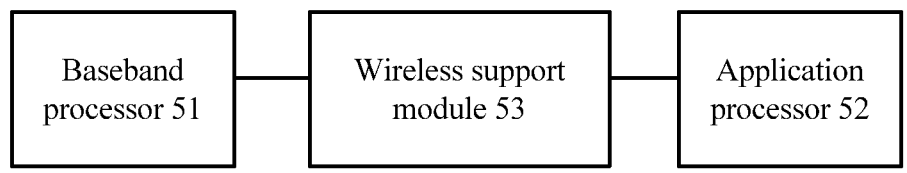
FIG. 5 is a schematic structural diagram of a terminal device according to Embodiment 5 of the present invention.

The terminal device in this embodiment may be specifically a smartphone, and particularly, a smartphone with a dual-card single-pass function. As shown in FIG. 5, the apparatus includes a baseband processor 51, an application processor 52, and a wireless support apparatus 53.

The baseband processor 51 is an important part of a mobile phone, is equivalent to a protocol processor, and is responsible for data processing and storage. Main components of the baseband processor 51 are units such as a digital signal processor (DSP), a microcontroller (MCU), and a memory (SRAM, Flash). Main functions of the baseband processor 51 are baseband encoding/decoding, sound encoding, voice encoding, and the like. In a highly integrated baseband processor 51, the baseband processor 51 may be specifically a highly complex System-On-a-Chip (SoC), which can not only support several communications standards, but also provide a multimedia function, and be used in a multimedia display, an image sensor, and an interface related to an audio device. In a terminal device such as a mobile phone, a baseband processor, a radio frequency, and another peripheral chip are used as a module to become a GSM/GPRS modem, so as to provide an AT command interface.

A full name of the application processor 52 is referred to as a multimedia application processor (MAP). A function of the application processor 52 is running an operating system and various application programs.

The wireless support apparatus 53 refers to an RIL. The RIL operates under the PPP and TCP/IP protocols, and is responsible for reliable data transmission, AT command sending, and response parsing. Certainly, in addition to supporting a network, the RIL also supports functions such as a short message service, and a voice call. A state machine (not shown in the figure) is disposed in the wireless support apparatus 53, is a module of software virtualization, and is configured to record a call state of the terminal device, for example, the state machine may record an outgoing call state of a first account in the terminal device as a sub0/MO call, record an incoming call state of the first account as a sub0/MT call, record an outgoing call state of a second account as a sub1/MO call, and record an incoming call state of the second account as a sub1/MT call.

The application processor 52 is configured to receive an outgoing call instruction input by a user.

The application processor 52 is further configured to send an outgoing call request message to the wireless support apparatus 53 according to the outgoing call instruction, where the outgoing call request message carries information about the first account of the first terminal device and information about a second terminal device.

The wireless support apparatus 53 is configured to obtain a state of the first terminal device.

When the state of the first terminal device is an idle state, the wireless support apparatus 53 is further configured to update the state of the first terminal device to the outgoing call state according to the outgoing call request message, and occupy a mutex lock.

The wireless support apparatus 53 is further configured to send a state change success message to the application processor 52.

The application processor 52 is further configured to send the outgoing call request message to the baseband processor 51 according to the state change success message.

The baseband processor 51 is configured to send a call request destined for the second terminal device to a network according to the outgoing call request message.

When the wireless support apparatus 53 updates the state of the first terminal device to the outgoing call state according to the outgoing call request message, the wireless support apparatus 53 is further configured to generate second verification code, where the second verification code includes the information about the first account and the information about the second user equipment.

When the application processor 52 receives a hang-up instruction used to terminate a call with the second terminal device, the application processor 52 is further configured to send a call termination message to the wireless support apparatus, where the call termination message includes the information about the first account and the information about the second terminal device; and the wireless support apparatus 53 is further configured to generate an outgoing call state release message according to the call termination message, and unlock the mutex lock, so as to reset the state of the first terminal device to the idle state with reference to the second verification code.

After the state is reset to the idle state, the second verification code further needs to be set to be invalid.

After the wireless support apparatus 53 updates the state of the first terminal device to the outgoing call state according to the outgoing call request message, and occupies the mutex lock, when the baseband processor 51 receives an incoming call request message that is sent by the network and that comes from a third terminal device, a solution to incoming call processing may be determined according to whether the application processor 52 of the terminal device has incoming call waiting configuration information. The incoming call waiting configuration information is preset by the user, and is stored in the terminal device. The configuration information can be obtained by using the application processor 52 of the terminal device.

In a first solution, when the incoming call waiting configuration information is not stored in the terminal device, the baseband processor 51 is further configured to send an incoming call prompt message to the wireless support apparatus 53 according to the incoming call request message, where the incoming call prompt message carries the information about the first account of the terminal device; the wireless support apparatus 53 is further configured to determine a state of the first terminal device; when the first terminal device is in the outgoing call state, the wireless support apparatus 53 is further configured to send incoming call rejection response information to the application processor 52; and the application processor 52 is further configured to send the incoming call rejection response information to the network by using the baseband processor 51.

In a second solution, when the incoming call waiting configuration information is stored in the application processor 52, and the incoming call request message is destined for the first account used for performing an outgoing call, the baseband processor 51 is further configured to send an incoming call prompt message to the wireless support apparatus 53 according to the incoming call request message, where the incoming call prompt message carries the information about the first account of the terminal device; the wireless support apparatus is further configured to process the incoming call prompt message, and when the information about the first account is identified, send the incoming call prompt message to the application processor 52; the application processor 52 is further configured to generate prompt information according to the incoming call prompt message, so as to prompt the user that an incoming call that comes from the third terminal device is received; and when the application processor 52 receives an outgoing call suspension instruction input by the user, send an outgoing call suspension message to the wireless support apparatus 53; the wireless support apparatus 53 is further configured to update the state of the first terminal device to an outgoing call suspension state according to the outgoing call suspension message, and suspend a call between the first terminal device and the second terminal device; and when the first terminal device is in the outgoing call suspension state, the baseband processor 51 receives incoming call information of the third terminal device and sends the incoming call information of the third terminal device to the application processor 52.

Further, after the wireless support apparatus 53 updates the state of the first terminal device to the outgoing call suspension state according to the outgoing call suspension message, when the application processor 52 receives an outgoing call restoration instruction input by the user, the application processor 52 is further configured to send an outgoing call restoration message to the wireless support apparatus 53; and the wireless support apparatus 53 is further configured to update the state of the first terminal device to the outgoing call state according to the outgoing call restoration message, and suspend a call between the first terminal device and the third terminal device.

When the application processor 52 receives a hang-up instruction used to terminate a call with the second terminal device, the application processor 52 is further configured to send a first call termination message to the wireless support apparatus 53, where the first call termination message includes the information about the first account and the information about the second terminal device; the wireless support apparatus 53 is further configured to generate an outgoing call state release message according to the hang-up instruction, and unlock the mutex lock, so as to reset the state of the first terminal device to the idle state with reference to the second verification code; and because the incoming call has not ended in this case, the wireless support apparatus 53 is further configured to update the state of the first terminal device to an incoming call state, occupy the mutex lock, and generate third verification code, where the third verification code includes the information about the first account and information about the third terminal device. A subsequent process of processing the incoming call has been described in detail in the foregoing embodiment, and is not described herein.

In addition, a case in which a voice path between the terminal device and the third terminal device is first disconnected may further exist.

In this case, the application processor 52 receives a hang-up instruction used to terminate a call with the third terminal device. The application processor 52 is further configured to send a second call termination message to the wireless support apparatus 53, where the second call termination message includes the information about the first account and information about the third terminal device.

The wireless support apparatus 53 generates an outgoing call suspension state release message according to the second call termination message, and changes the state of the first terminal from the outgoing call suspension state to the outgoing call state.

In a third solution, the incoming call waiting configuration information is stored in the application processor 52, but the incoming call request message is not destined for the first account used for performing an outgoing call, but is destined for the second account.

The baseband processor 51 sends an incoming call prompt message to the wireless support apparatus 53, where the incoming call prompt message carries information about the second account. The wireless support apparatus 53 processes the incoming call prompt message, and when the information, about the first account, same as that in the outgoing call instruction cannot be identified, or it is identified that information, about an account, different from that in the outgoing call request message is carried in the incoming call prompt message, rejects the incoming call request. The baseband processor 51 further releases a memory occupied by the incoming call request and a relevant parameter.

A detailed working process of the baseband processor 51, the application processor 52, and the wireless support apparatus 53 that are included in the foregoing terminal device in a scenario in which the first terminal device actively initiates an outgoing call has been described in detail in the foregoing corresponding method embodiment, and is not described herein.

The terminal device in this embodiment may be implemented by the entity shown in FIG. 4, which is not described herein.

When receiving an outgoing call request message input by a user, the terminal device provided in this embodiment first determines whether a current state of the first terminal device that is recorded by a state machine in the first terminal device is an idle state; and when the first terminal device is in the idle state, updates the state of the first terminal device to an outgoing call state, and protects the outgoing call state of the first terminal device by using a mutex lock; or if the current state of the first terminal device is not the idle state, rejects the outgoing call request message. If an incoming call is received when the first terminal device is in the outgoing call state, the incoming call is processed according to whether incoming call waiting is set. If no incoming call waiting is set or an account corresponding to an incoming call request is not an account that is performing an outgoing call, the incoming call is directly rejected; or if the incoming call waiting is set and an account corresponding to an incoming call request is an account that is performing an outgoing call, the incoming call and the outgoing call may be switched, so as to implement, in a different state of the first terminal device, voice communication with a terminal device that performs an incoming call or voice communication with a terminal device that performs an outgoing call. This embodiment of the present invention provides a stable and reliable call collision processing mechanism, which can improve user experience.

Although various scenarios in which a call collision occurs in a dual-card single-pass mobile phone are mainly used as examples for description in the present invention, the processing method and the terminal device that are provided in the present invention are not limited to being applied to the dual-card single-pass mobile phone, and may further be slightly changed, so as to be applied to a single-card single-pass mobile phone or a dual-card dual-pass mobile phone. The application scenarios provided in the foregoing embodiments are not intended to limit the protection scope of the present invention.

Professional personnel may be further aware that, in combination with the examples described in the embodiments disclosed in this specification, units and algorithm steps may be implemented by electronic hardware, and the foregoing has generally described compositions and steps of each example according to functions. Different methods may be used to implement the described functions for each particular application, but it should not be considered that the implementation goes beyond the scope of the embodiments of the present invention. Specifically, both the calculation part and the control part may be implemented by logic hardware, and the logic hardware may be a logic integrated circuit manufactured by using an integrated circuit technology, and is not limited in the embodiments.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disk read only memory (CD-ROM), or any other form of storage medium known in the art. In the foregoing specific implementation manners, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made without departing from the spirit and principle of the embodiments of the present invention shall fall within the protection scope of the embodiments of the present invention.

What is claimed is:

1. A method comprising:
   receiving, by a baseband processor of a first terminal device, an incoming call request message sent by a network, wherein the incoming call request message comes from a second terminal device, and wherein the incoming call request message carries information about a first account of the first terminal device, the first terminal device comprising a baseband processor, a wireless support apparatus includes a state machine, and an application processor, wherein the first account comprises a SIM card of a mobile phone;
   sending, by the baseband processor, an incoming call prompt message to a wireless support apparatus of the first terminal device according to the incoming call request message, wherein the incoming call prompt message comprises the information about the first account;
   obtaining, by the wireless support apparatus, a state of the first terminal device;
   updating, by the wireless support apparatus, the state of the first terminal device to an incoming call state according to the incoming call prompt message, and occupying a mutex lock, in response to the state of the first terminal device being an idle state;

sending, by the wireless support apparatus, a state change success message to the baseband processor;

sending, by the baseband processor, the incoming call request message to an application processor of the first terminal device according to the state change success message; and prompting, by the application processor, a user, about incoming call information, according to the incoming call request message.

2. The method according to claim 1, wherein the method further comprises:

generating, by the wireless support apparatus, a first verification code, in response to the state of the first terminal device being the idle state, wherein the first verification code comprises the information about the first account and information about the second terminal device.

3. The method according to claim 2, wherein the method further comprises:

sending, by the application processor, a call termination message to the wireless support apparatus, in response to the application processor receiving a hang-up instruction terminating a call connection between the first terminal device and the second terminal device, wherein the call termination message comprises the information about the first account and the information about the second terminal device;

sending, by the baseband processor, a call termination message to the wireless support apparatus, in response to the baseband processor receiving a hang-up instruction sent by the network and terminating a call connection between the first terminal device and the second terminal device;

generating, by the wireless support apparatus, an incoming call state release message according to the call termination message, and unlocking the mutex lock; and resetting, by the first terminal device, the state of the first terminal device to the idle state according to the incoming call state release message and the first verification code.

4. The method according to claim 1, wherein the method further comprises:

sending, by the application processor, an outgoing call request message to the wireless support apparatus according to the outgoing call request message, after updating, by the wireless support apparatus, the state of the first terminal device to the incoming call state;

obtaining, by the wireless support apparatus, a state of the first terminal device; and sending, by the wireless support apparatus, outgoing call rejection response information to the application processor, in response to the state of the first terminal device being the incoming call state.

5. The method according to claim 4, the method further comprises:

obtaining, by the wireless support apparatus, pre-stored configuration information of an incoming call/outgoing call priority; and choosing, by the wireless support apparatus according to the configuration information, to update the state of the first terminal device to the incoming call state or to an outgoing call state.

6. The method according to claim 1, wherein the method further comprises:

sending, by the wireless support apparatus, a state change rejection message to the baseband processor, in response to the state of the first terminal device being an incoming call state or an outgoing call state; and sending, to the network by the baseband processor according to the state change rejection message, response information that rejects an incoming call from the second terminal device.

7. A method comprising:

receiving, by an application processor of a first terminal device, an outgoing call instruction, input by a user, the first terminal device comprising a baseband processor, a wireless support apparatus includes a state machine, and an application processor;

sending, by the application processor, an outgoing call request message to a wireless support apparatus of the first terminal device, according to the outgoing call instruction, wherein the outgoing call request message carries information about a first account of the first terminal device and information about a second terminal device, wherein the first account comprises a SIM card of a mobile phone;

obtaining, by the wireless support apparatus, a state of the first terminal device;

updating, by the wireless support apparatus, the state of the first terminal device to an outgoing call state according to the outgoing call request message, and occupying a mutex lock, in response to the state of the first terminal device being an idle state;

sending, by the wireless support apparatus, a state change success message to the application processor;

sending, by the application processor, the outgoing call request message to a baseband processor of the first terminal device, according to the state change success message; and sending, by the baseband processor, a call request destined for the second terminal device, to a network, according to the outgoing call request message.

8. The method according to claim 7, wherein the method further comprises:

generating, by the wireless support apparatus, second verification code, in response to the wireless support apparatus updating the state of the first terminal device to the outgoing call state according to the outgoing call request message, wherein the second verification code comprises the information about the first account and the information about the second terminal device.

9. The method according to claim 8, wherein the method further comprises:

sending, by the application processor, a call termination message to the wireless support apparatus, in response to the application processor receiving a hang-up instruction terminating a call connection between the first terminal device and the second terminal device, wherein the call termination message comprises the information about the first account and the information about the second terminal device;

sending, by the baseband processor, a call termination message to the wireless support apparatus, in response to the baseband processor receiving a hang-up instruction sent by the network and terminating a call connection between the first terminal device and the second terminal device;

generating, by the wireless support apparatus, an outgoing call state release message according to the call termination message, and unlocking the mutex lock; and resetting, by the first terminal device, the state of the first terminal device to the idle state according to the outgoing call state release message and the second verification code.

10. The method according to claim 9, the method further comprising:
sending, by the baseband processor, an incoming call prompt message to the wireless support apparatus according to an incoming call request message, after updating, by the wireless support apparatus, the state of the first terminal device to the outgoing call state;
obtaining, by the wireless support apparatus, a state of the first terminal device;
sending, by the wireless support apparatus, incoming call rejection response information to the application processor, in response to the state of the first terminal device being the outgoing call state; and
sending, by the application processor, the incoming call rejection response information to the network using the baseband processor.

11. The method according to claim 10, further comprising:
sending, by the baseband processor, an incoming call prompt message to the wireless support apparatus according to the incoming call request message, after updating, by the wireless support apparatus, the state of the first terminal device to the outgoing call state according to the outgoing call request message, when the baseband processor receives an incoming call request message sent by the network, that comes from a third terminal device, wherein the incoming call prompt message carries the information about the first account of the first terminal device;
processing, by the wireless support apparatus, the incoming call prompt message;
sending the incoming call prompt message to the application processor, in response to the information about the first account being identified;
generating, by the application processor, prompt information according to the incoming call prompt message, to inform the user that an incoming call that comes from the third terminal device is received;
sending an outgoing call suspension message to the wireless support apparatus, in response to the application processor receiving an outgoing call suspension instruction input by the user;
updating, by the wireless support apparatus, the state of the first terminal device to an outgoing call suspension state according to the outgoing call suspension message;
suspending a call between the first terminal device and the second terminal device; and
receiving, by the baseband processor, incoming call information of the third terminal device and sending the incoming call information of the third terminal device to the application processor, in response to the state of the first terminal device being the outgoing call suspension state.

12. The method according to claim 11, wherein the method further comprises:
sending an outgoing call restoration instruction message to the wireless support apparatus, in response to the application processor receiving an outgoing call restoration instruction input by the user, after updating, by the wireless support apparatus, the state of the first terminal device to the outgoing call suspension state;
updating, by the wireless support apparatus, the state of the first terminal device to the outgoing call state according to the outgoing call restoration instruction message; and
suspending a call between the first terminal device and the third terminal device.

13. The method according to claim 11, wherein the method further comprises:
sending, by the application processor, a first call termination message to the wireless support apparatus, in response to the application processor receiving a hang-up instruction terminating a call with the second terminal device, wherein the first call termination message comprises the information about the first account and the information about the second terminal device;
generating, by the wireless support apparatus, an outgoing call state release message according to the first call termination message, and unlocking the mutex lock;
resetting, by the first terminal device, the state of the first terminal device to the idle state, according to the outgoing call state release message and the second verification code; and
updating, by the wireless support apparatus, the state of the first terminal device to an incoming call state, occupying the mutex lock, and generating third verification code, wherein the third verification code comprises the information about the first account and information about the third terminal device.

14. The method according to claim 11, wherein the method further comprises:
sending, by the application processor, a second call termination message to the wireless support apparatus, in response to the application processor receiving a hang-up instruction terminating a call with the third terminal device, wherein the second call termination message comprises the information about the first account and information about the third terminal device;
generating, by the wireless support apparatus, an outgoing call suspension state release message according to the second call termination message; and
changing the state of the first terminal device from the outgoing call suspension state to the outgoing call state.

15. The method according to claim 7, the method further comprising:
sending, by the wireless support apparatus, a state change rejection message to the application processor, in response to the state of the first terminal device being an incoming call state or an outgoing call state; and
rejecting, by the application processor according to the state change rejection message, the outgoing call request message destined for the second terminal device.

16. A first terminal device, wherein the first terminal device, comprising:
a baseband processor, a wireless support apparatus including a state machine, and an application processor;
a first non-transitory computer readable storage medium storing a first program for execution by the baseband processor, the first program including first instructions to:
receive an incoming call request message sent by a network, and wherein the incoming call request message comes from a second terminal device, and wherein the incoming call request message carries information about a first account of the first terminal device, wherein the first account comprises a SIM card of a mobile phone; and send an incoming call prompt message to a wireless support apparatus according to the incoming call request message, wherein the incoming call prompt message comprises the information about the first account;

the wireless support apparatus coupled to the baseband processor, the wireless support apparatus configured to:
obtain a state of the first terminal device;
update the state of the first terminal device to an incoming call state according to the incoming call request message, and occupy a mutex lock, in response to the state of the first terminal device being an idle state; and
send a state change success message to the baseband processor, wherein the first instructions further comprise first instructions to send the incoming call request message to an application processor according to the state change success message;

an application processor coupled to the baseband processor; and a second non-transitory computer readable storage medium storing a second program for execution by the application processor, the second program including second instructions to:
prompt a user about incoming call information according to the incoming call request message.

17. The first terminal device according to claim 16, wherein the wireless support apparatus is further configured to:
generate first verification code, in response to the wireless support apparatus updating the state of the first terminal device to the incoming call state, wherein the first verification code comprises the information about the first account and information about the second terminal device.

18. The first terminal device according to claim 17, wherein the second instructions further comprise instructions to:
send a call termination message to the wireless support apparatus, in response to the application processor receiving a hang-up instruction terminating a call with the second terminal device, wherein the call termination message comprises the information about the first account and the information about the second terminal device; and
wherein the wireless support apparatus is further configured to generate an incoming call state release message according to the call termination message, and unlock the mutex lock, to reset the state of the first terminal device to the idle state, with reference to the first verification code.

19. The first terminal device according to claim 16, wherein the second instructions further comprise instructions to:
send an outgoing call request message to the wireless support apparatus according to an outgoing call instruction, in response to the state of the first terminal device being the incoming call state, and the application processor receiving the outgoing call instruction, input by the user; and
wherein the wireless support apparatus is further configured to:
obtain a state of the first terminal device; and
send outgoing call rejection response information to the application processor, in response to the state of the first terminal device being the incoming call state.

20. The first terminal device according to claim 19, wherein the second instructions further comprise second instructions to:
send the outgoing call request message to the wireless support apparatus, in response to the baseband processor sending the incoming call prompt message to the wireless support apparatus of the first terminal device; and
wherein the wireless support apparatus is further configured to:
obtain pre-stored configuration information of an incoming call/outgoing call priority; and
choose, according to the configuration information, to update the state of the first terminal device to the incoming call state or to an outgoing call state.

* * * * *